United States Patent Office 3,694,388
Patented Sept. 26, 1972

3,694,388
ACRYLIC POLYMERS
William Connelly, Leonard Sydenham, and John Szilagyi, Toronto, Ontario, Canada, assignors to Canadian Industries Limited, Montreal, Quebec, Canada
No Drawing. Filed July 2, 1970, Ser. No. 52,063
Int. Cl. C08f 27/12
U.S. Cl. 260—23 EP    5 Claims

ABSTRACT OF THE DISCLOSURE

An acrylic polymeric material consisting of the reaction product of (1) a copolymer of essentially methyl methacrylate and glycidyl acrylate or methacrylate and an aliphatic monocarboxylic acid selected from lauric acid, 4-amino-butyric acid, 11-amino-undecanoic acid, pyruvic acid and dimethoxy-phenylacetic acid.

---

This invention relates to novel acrylic polymers and to novel acrylic coating compositions of the type commonly referred to as acrylic lacquers. More particularly, it relates to copolymers of methyl methacrylate and glycidyl acrylate or methacrylate modified by reaction with aliphatic acids and to coating compositions containing the modified copolymers.

Polymethyl methacrylate is widely used as a coating material because of its particular resistance to prolonged outdoor exposure. Because of this quality, polymethyl methacrylate lacquers have been found to be especially useful for the finishing of automobile bodies as well as other metallic articles subject to frequent or prolonged outdoor exposure. Such lacquers however, suffer from a serious limitation in that they do not adhere well to conventional primers such as those commonly used under alkyd resin enamels, amino aldehyde resin enamels and nitrocellulose lacquers. Consequently, when it is desired to apply a polymethyl methacrylate lacquer to a substrate which has previously received a coat of a conventional primer, it is necessary to apply an intermediate coat of a sealing lacquer between the primer coat and the top coat of polymethylmethacrylate.

The primary object of this invention is to provide a new type of film-forming acrylic polymer and coating composition containing the same which show good adherence to conventional primers as well as good durability and high gloss retention on outdoor exposure.

A secondary object is to dispense with the necessity of applying an intermediate coat of a sealing lacquer in the circumstances and manner hereinbefore mentioned.

The above as well as other objects will clearly appear hereinafter.

According to this invention, a new type of acrylic polymer is provided which, generally speaking is the reaction product of (1) a copolymer of essentially, methyl methacrylate and glycidyl acrylate or methacrylate and (2) an aliphatic monocarboxylic acid.

The term "copolymer of essentialy methyl methacrylate and glycidyl acrylate or methacrylate" as used herein means a copolymer derived from, essentially, at least 75 parts by weight of methyl methacrylate and from 0.5 to 25 parts by weight of glycidyl acrylate or methacrylate, the total parts being 100. The copolymer may, in addition to the above essential monomer moieties, contain moieties of other copolymerisable, ethylenically unsaturated monomeric material which does not react with the glycidyl acrylate or methacrylate moiety. Such copolymerisable material includes, for example, the alkyl esters of acrylic acid and methacrylic acid, vinyl acetate, acrylonitrile and styrene. Preferred copolymers are those derived from the monomers methyl methacrylate and glycidyl acrylate or methacrylate in a weight ratio of 90–99:10–1, and particularly preferred is that derived from said monomers in a weight ratio of 95:5.

The acrylic polymers in accordance with the invention are preferably prepared by first forming a copolymer containing moieties of methyl methacrylate and glycidyl acrylate or methacrylate in the above defined proportions and, if desired, a minor amount of moieties of copolymerisable monomer and then esterifying the resulting copolymer with an aliphatic monocarboxylic acid.

The copolymer may be prepared by any of the well known polymerisation methods, viz. by granular, emulsion or solution polymerisation of the comonomers. A preferred method of preparing the copolymer involves introducing suitable proportion of the comonomers together with a solvent which may be a solvent for both the monomers and the copolymer and with a catalyst such as one of the well known organic peroxide caatlysts, e.g. benzoyl peroxide, into a reaction vessel in which the mixture is heated with continuous agitation for a period of at least 2 hours followed by cooling. The copolymer is obtained in the form of an approximately 50% solids solution.

The copolymer is thereafter esterified by an suitable method. In a preferred method, the 50% solution of the copolymer as above obtained, is slightly diluted and brought to reflux in a reaction vessel. An aliphatic monocarboxylic acid in the form of a solution is then added with a catalyst and the reaction is alolwed to proceed until the desired degree of esterification has been reached.

The resulting ester link is of the type produced by reacting a carboxyl group with an epoxy group in that the opening of the epoxy ring results not only in the production of an ester link to one carbon atom but also in the production of an hydroxyl group on an adjacent carbon atom.

Any aliphatic monocarboxylic acid is suitable for esterification, whether unsubstituted or preferably substituted with at least one polar group other than the hydroxy group. Typical polar groups and their approximate dipole moments are:

DIPOLE MOMENT $(10^{-18}$ e.s.u.)

4.5 —$NR_3^+$, —$SO_3''$, —$COO'$, betaines —$R_3N^+CH_2CO_2$
4.0 —CN, —NC, —RN=C=O, —RN=C=S, —$NO_2$
3.0— $COCl_2$, —NO

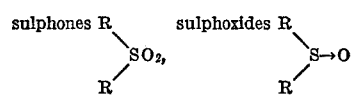

nitrites, nitrates, amine oxides—$R_3N \longrightarrow O$ 2.8 —Ketones—C—R, —C—H
           ‖       ‖
           O       O oximes—C=NOH 2.5 —$SO_2NH_2$, —$CF_3$, —$CCl_3$, $CHCl_2$, $CH_2Cl$
2.0 —$SO_3H$, —COOR
1.5 halogen, —NHCOR
1.3 —OR, —SR
1.0 —$NH_2$, —NHR, —$NR_2$ R signifies an alkyl or aryl group.
This list gives numerical values without reference to direction.

Suitable acids include, for example, lauric acid, 4-amino butyric acid, 11-amino undecanoic acid, pyruvic acid and dimethoxy phenyl actic acid. Particularly preferred are the aliphatic monocarboxylic acids carrying an amino group substituent.

As mentioned above, it is also an object of this invention to provide a novel type of coating composition formulated from the above described esterified copolymer.

The coating compositions in accordance with this invention comprise an organic solvent and, as the essential film-forming materials: (1) at least 40 parts by weight of acrylic polymeric material selected from (a) copolymers of essentially, at least 75 parts by weight of methyl methacrylate and from 0.5 to 25 parts by weight of glycidyl acrylate or methacrylate, the total parts of the copolymer ingredients being 100, esterified with an aliphatic monocarboxylic acid, either unsubstituted or substituted with at least one polar group other than the hydroxy group, and (b) mixtures of said esterified copolymers with homopolymers of methyl methacrylate or with copolymers of methyl methacrylate and an ethylenically unsaturated monomer copolymerisable therewith and inert towards the esterified glycidyl moiety of said esterified copolymer; (2) up to 50 parts by weight of at least one compatible plasticiser; and (3) up to 35 parts by weight of cellulose acetate butyrate, the total parts by weight of film-forming materials being 100; the glycidyl acrylate or methacrylate moiety of any copolymer (a) prior to esterification thereof constituting from about 0.5% to about 25% by weight of ingredient (1) of the essential film-forming materials.

Thus the essential feature of the lacquers or coating compositions of this invention is that the acrylic polymeric material forming one of the essential film-forming materials thereof must comprise the esterified copolymer hereinbefore described and in such proportions that the adhesion promoting moiety thereof, i.e. the glycidyl acrylate or methacrylate moiety, prior to esterification, constitutes from about 0.5% to about 25% of the total weight of said polymeric material. It has been found unnecessary to include more than 25% by weight of glycidyl acrylate or methacrylate in the acrylic polymer 40 component of the film forming materials as no further advantage seems to be gained by doing so. In most cases the acrylic polymer should contain preferably from about 1% to about 10% by weight of the glycidyl acrylate or methacrylate moiety.

The copolymers of methyl methacrylate which can be used in admixture with the esterified copolymer are those copolymers of methyl methacrylate and ethylenically unsaturated monomers which are essentially inert towards the esterified glycidyl moiety of the esterified copolymers. Examples of such monomers are the alkyl esters of acrylic acid and methacrylic acid, vinylacetate, acrylonitrile and styrene.

The viscosity average molecular weight of the film-forming acrylic polymeric material (including both the esterified copolymer and methyl methacrylate homo- or copolymer) should be in the range of 400,000 to 150,000 and, in the case of automotive lacquers, should preferably be between 75,000 and 100,000. By using a film forming polymer in these ranges and especially in the latter, it is possible to produce sprayable lacquers of high solids, such as lacquers of from about 12% to 20% by weight of non-volatile solids concentration.

The lacquers may contain one or more plasticisers in an amount of up to 50%, preferably from 20% to 40%, by weight of the film-forming materials. Generally the plastizers suitable for use in the coating compositions of the invention are those which are compatible with the other film-forming materials, i.e. do not react with, or appreciably separate from the other film-forming materials of the formulated coating compositions. A preferred plasticizer is an oil-free polyester which is particularly compatible with, and has a very low tendency to separate from, acrylic polymers. Most preferred is the oil-free polyester obtained by reacting through known methods neopentyl glycol, adipic acid, phthalic anhydride and butyl alcohol in a mole ratio of 3:2:2:2 respectively. The preferred alkyd resins have an oil length of from 15 to 55, preferably 20 to 35, and from 1% to 6%, preferably 3% to 5%, of unreacted hydroxyl. A still preferred alkyd resin is one modified with coconut oil.

Examples of other plasticizers that are suitable include benzylbutyl phthalate, dibutyl phthalate, triphenyl phosphate, 2-ethyl hexyl benzyl phthalate and dicyclohexyl phthalate. The particular plasticizer and the amount thereof used are chosen in accordance with the demand for compatibility and other film forming properties.

The lacquers of this invention may also contain up to 35, preferably from 10 to 25, parts by weight of cellulose acetate butyrate by weight of the film-forming materials. The cellulose acetate butyrate can be any of the lacquer-grade materials conventionally used in the coating art.

In formulating the lacquers, the film-forming materials are dissolved in an organic solvent which can be any of the well known organic solvents commonly used in the lacquer art. Suitable solvents are, for example, toluene, xylenes, acetone, methyl ethyl ketone, methyl isobutyl ketone, methyl isopropyl ketone, amyl alcohol, ethylene dichloride, cyclohexanone, and aromatic hydrocarbon mixtures. While certain of these solvents cannot be used alone because of lack of solvent power for one or more of the film-forming materials, they can be used in admixture with others.

While, for certain purposes, a clear lacquer may be employed, it is a general practice to include pigments. The latter are used in conventional proportions and are selected from the well known pigments such as metal oxides, hydroxides, chromates, silicates, sulfides, sulfates, carbonates and carbon blacks, organic dyestuffs and flakes thereof, and metal flake pigments.

The coating compositions of this invention can also include any of the additives which are commonly used in conventional lacquers such as dispersing agents, flow control agents, etc.

The lacquers of the present invention have the very important advantage that they can be applied directly and adhere very well to conventional metal-protecting and rust-inhibiting prime coats to which methyl methacrylate lacquers of the prior art characterisctically do not adhere appreciably. The metal primers to which the present lacquers may be applied include, for example, the drying oil-modified alkyd resins, rosin-modified alkyd resins, mixtures of alkyd and aminoplast resins, mixtures of alkyd and epoxy resins, mixtures of alkyd, aminoplast and epoxy resins, mixtures of epoxidized esters of higher fatty acids and aminoplast resins, etc.

The lacquers may be applied to primed substrates by any of the conventional techniques, e.g. by spray, brush, dip coating, etc. The coating is thereafter baked at a temperature of from about 200° F. to about 300° F. or more. The higher the baking temperature, the shorter is the drying time.

The following Examples are intended to illustrate the invention and not to limit it in any way. Parts are by weight unless otherwise specified.

Example 1

A 95/5 methyl methacrylate/glycidyl methacrylate copolymer was prepared by polymerising a mixture of:

| | Parts |
|---|---|
| Methyl methacrylate | 1520 |
| Glycidyl methacrylate | 80 |
| Toluene | 1120 |
| Methyl isobutyl ketone | 480 |
| Benzoyl peroxide | 11.6 | to produce a solution containing about 50%, by weight of copolymer.

The solution was diluted to 35% solids content with methyl isobutyl ketone and esterified by refluxing for 7.5 hours a mixture of:

| | Parts |
|---|---|
| Copolymer solution (35%) | 286 |
| Nitrobenzene | 47 |
| Lauric acid | 7 |
| Dimethyl tertiary amine | 1 |

A lacquer was prepared containing the resulting esterified copolymer, cellulose acetate butyrate, coconut oil modified alkyd resin, polymethyl methacrylate and a pigment in a 39.3:21.9:32.8:4.2:1.8 approximate weight ratio.

This lacquer, when applied to a primed steel surface to which conventional lacquers do not adhere well, and baked thereon for 30 minutes at 300° F., produced a film having very good adhesion to said primed steel surface.

Example 2

A 95/5 methyl methacrylate/glycidyl methacrylate copolymer in 35% solids solution such as obtained in Example 1 was esterified with 4-amino butyric acid by refluxing for 8.25 hours the following mixture of:

| | Parts |
|---|---|
| Copolymer solution (35%) | 286 |
| 4-amino butyric acid | 3.62 |
| Formamide | 30 |
| Methyl isobutyl ketone | 24.5 |
| Dimethyl tertiary amine | 1.5 |

The resulting esterified copolymer was formulated into a lacquer similar to that described in Example 1 except for the substitution of the esterified copolymer.

The lacquer, when applied and baked as in Example 1, gave a film having very good adhesion to primer coat.

Example 3

A 95/5 methyl methacrylate/glycidyl methacrylate copolymer in 35% solids solution such as obtained in Example 1 was esterified with 11-amino undecanoic acid by refluxing for 8.5 hours the following mixture of:

| | Parts |
|---|---|
| Copolymer solution (35%) | 286 |
| 11-amino undecanoic acid | 7.1 |
| Formamide | 50 |
| Acetone | 10 |
| Dimethyl tertiary amine | 1.5 |

The resulting esterified copolymer was formulated into a lacquer similar to that described in Example 1 except for the substitution of the esterified copolymer.

When applied to a primed steel surface and baked thereon as in Example 1, the lacquer resulted in a dried film which adhered very well to the primer coat.

Example 4

A 98/2 methyl methacrylate/glycidyl methacrylate copolymer was prepared by polymerizing a mixture of:

| | Parts |
|---|---|
| Methyl methacrylate | 1176 |
| Glycidyl methacrylate | 24 |
| Toluene | 840 |
| Methyl isobutyl ketone | 360 |
| Benzoyl peroxide | 11.3 | to produce a solution containing about 50% by weight of copolymer.

The solution was diluted to 40% solids with methyl isobutyl ketone and esterified with pyruvic acid by refluxing for 4 hours a mixture of:

| | Parts |
|---|---|
| Copolymer solution (40%) | 375.0 |
| Methyl isobutyl ketone | 52.5 |
| Dimethyl tertiary amine | 1.5 |
| Pyruvic acid | 1.86 |
| Toluene | 1.00 |

A lacquer was prepared containing the resulting esterified copolymer, cellulose acetate butyrate, oil free polyester, and pigment in a 52.3:21.5:23.8:2.4 approximate solids weight ratio.

This lacquer, when applied to a primed steel surface to which conventional lacquers do not adhere well, and baked thereon for 30 minutes at 310° F., produced a film having good adhesion to said primed steel surface.

Example 5

A 99/1 methyl methacrylate/glycidyl methacrylate copolymer was prepared by polymerising a mixture of

| | Parts |
|---|---|
| Methyl methacrylate | 1584 |
| Glycidyl methacrylate | 16 |
| Toluene | 1120 |
| Methyl isobutyl ketone | 480 |
| Benzoyl peroxide | 11.6 | to produce a solution containing about 50% by weight of copolymer.

The solution as diluted to 40% solids with methyl isobutyl ketone and esterified with 4-amino butyric acid by refluxing for 9 hours a mixture of

| | Parts |
|---|---|
| Copolymer solution (40%) | 250 |
| 4-amino butyric acid | 0.73 |
| Formamide | 5 |
| Methyl isobutyl ketone | 31 |
| Dimethyl tertiary amine | 1.5 |

The resulting esterified copolymer was formulated into a lacquer similar to that prepared in Example 1 except for the substitution of the esterified copolymer.

When applied to a primed steel surface and baked thereon as in Example 1, the lacquer produced a dried film having much improved adhesion as compared with films of conventional lacquers.

Example 6

A 90/10 methyl methacrylate/glycidyl methacrylate copolymer was prepared by polymerizing a mixture of:

| | Parts |
|---|---|
| Methyl methacrylate | 45.0 |
| Glycidyl methacrylate | 5.0 |
| Toluene | 34.9 |
| Methyl isobutyl ketone | 14.9 |
| Benzoyl peroxide | 0.36 | to produce a solution containing about 50% by weight of copolymer.

The solution was diluted to 40% solids with methyl isobutyl ketone and esterified with pyruvic acid by refluxing for 7 hours a mixture of:

| | Parts |
|---|---|
| Copolymer solution (40%) | 375.0 |
| Methyl isobutyl ketone | 52.5 |
| Dimethyl tertiary amine | 2.0 |
| Pyruvic acid | 9.3 |
| Toluene | 1.0 |

A lacquer was prepared containing the resulting esterified copolymer, cellulose acetate butyrate, benzyl butyl phthalate, polymethyl methacrylate, and pigment in a 9.1:21.5:23.8:43.2:2.4 approximate solids weight ratio.

This lacquer, when applied to a primed steel surface to which conventional lacquers do not adhere well, and baked thereon for 30 minutes at 310° F., produced a film having, particularly good adhesion to said primed steel surface.

Example 7

A 75/25 methyl methacrylate/glycidyl methacrylate copolymer was prepared by polymerizing a mixture of:

| | Parts |
|---|---|
| Methyl methacrylate | 1200 |
| Glycidyl methacrylate | 400 |
| Toluene | 1120 |
| Methyl isobutyl ketone | 480 |
| Benzoyl peroxide | 11.6 | to produce a solution containing about 50% by weight of copolymer.

The solution was diluted to 40% solids with methyl isobutyl ketone and esterified with dimethyl phenyl acetic acid by refluxing for 6 hours a mixture of:

| | Parts |
|---|---|
| Copolymer solution (40%) | 375.0 |
| Methyl isobutyl ketone | 52.5 |
| Dimethy tertiary amine | 1.5 |
| Dimethoxy lphenyl acetic acid | 51.8 |

A lacquer was prepared containing the resulting esterified copolymer, cellulose acetate butyrate, oil-free polyester, and pigment in a 52.3:21.5:23.8:2.4 approximate solids weight ratio.

This lacquer, when applied to a primed steel surface to which conventional lacquers do not adhere well, and baked thereon for 30 minutes at 310° F., produced a film having good adhesion to said primed steel surface.

Example 8

A 98/2 methyl methacrylate/glycidyl methacrylate copolymer was prepared by polymerizing a mixture of:

| | Parts |
|---|---|
| Methyl methacrylate | 1176 |
| Glycidyl methacrylate | 24 |
| Toluene | 840 |
| Methyl isobutyl ketone | 360 |
| Benzoyl peroxide | 8.7 | to produce a solution containing about 50% by weight of copolymer.

The solution was diluted to 40% solids with methyl isobutyl ketone and esterified with dimethoxy phenyl acetic acid by refluxing for 6 hours a mixture of:

| | Parts |
|---|---|
| Copolymer solution (40%) | 375.0 |
| Methyl isobutyl ketone | 52.5 |
| Dimethyl tertiary amine | 1.5 |
| Dimethoxy phenyl acetic acid | 4.2 |
| Toluene | 1.0 |

A lacquer was prepared containing the resulting esterified copolymer, cellulose acetate butyrate, benzyl butyl phthalate, polymethyl methacrylate, and pigment in a 9.1:21.5:23.8:43.2:2.4 approximate solids weight ratio.

This lacquer, when applied to a primed steel surface to which convention lacquers do not adhere well, and baked thereon for 30 minutes at 310° F., produced a film having particularly good adhesion to said primed steel surface.

Example 9

A 95/5 methyl methacrylate/glycidyl acrylate copolymer was prepared by polymerizing a mixture of:

| | Parts |
|---|---|
| Methyl methacrylate | 1520 |
| Glycidyl acrylate | 80 |
| Toluene | 1120 |
| Methyl isobutyl ketone | 480 |
| Benzoyl peroxide | 11.6 | to produce a solution containing about 50% by weight of copolymer.

The solution was diluted to 40% with methyl isobutyl ketone and esterified with 4-amino butyric acid by refluxing for 6 hours a mixture of:

| | Parts |
|---|---|
| Copolymer solution (40%) | 375.0 |
| Methyl isobutyl ketone | 40.0 |
| Toluene | 1.0 |
| Formamide | 70.0 |
| Dimethyl tertiary amine | 1.5 |
| 4-amino butyric acid | 6.04 |

A lacquer was prepared containing the resulting esterified copolymer, cellulose acetate butyrate, oil free polyester, polymethyl methacrylate, and pigment in a 9.1:21.5:23.8:43.2:2.4 approximate solids weight ratio. This lacquer, when applied to a primed steel surface to which conventional lacquers do not adhere well, and baked thereon for 30 minutes at 310° F., produced a film having particularly good adhesion to said primed steel surface.

Example 10

A 75/25 methyl methacrylate/glycidyl acrylate copolymer was prepared by polymerizing a mixture of:

| | Parts |
|---|---|
| Methyl methacrylate | 1200 |
| Glycidyl acrylate | 400 |
| Toluene | 1120 |
| Methyl isobutyl ketone | 480 |
| Benzoyl peroxide | 11.6 | to produce a solution containing about 50% by weight of copolymer.

The solution was diluted to 40% with methyl isobutyl ketone and esterified with dimethoxy phenyl acetic acid by refluxing for 4¼ hours a mixture of:

| | Parts |
|---|---|
| Copolymer solution (40%) | 187.5 |
| Methyl isobutyl ketone | 26 |
| Toluene | 0.5 |
| Dimethoxy phenyl acetic acid | 28 |
| Dimethyl tertiary amine | 0.75 |

A lacquer was prepared containing the resulting esterified copolymer, cellulose acetate butyrate, oil free polyester, polymethyl methacrylate, and pigment in a 9.1:21.5:23.8:43.2:2.4 approximate solids weight ratio. This lacquer, when applied to a primed steel surface to which conventional lacquers do not adhere well, and baked thereon for 30 minutes at 310° F., produced a film having particularly good adhesion as compared with films of conventional lacquers.

What we claim is:

1. An acrylic polymeric material consisting of the reaction product of (1) a copolymer of essentially methyl methacrylate and glycidyl acrylate or methacrylate and an aliphatic mono-carboxylic acid selected from lauric acid, 4-amino-butyric acid, 11-amino-undecanoic acid, pyruvic acid and dimethoxy-phenyl acetic acid.

2. An acrylic polymer as claimed in claim 1 wherein the copolymer is derived from at least 75 parts by weight of methyl methacrylate and 0.5 to 25 parts by weight of glycidyl acrylate or methacrylate, the total parts being 100.

3. An acrylic polymer as claimed in claim 1 wherein the copolymer is a copolymer of methyl methacrylate and glycidyl acrylate or methacrylate in a weight ratio of 90–99; 10–1.

4. An acrylic polymer as claimed in claim 1 wherein the copolymer is a copolymer of methyl methacrylate and glycidyl acrylate or methacrylate in a weight ratio of 95:5.

5. An acrylic polymer as claimed in claim 1 wherein the copolymer is derived from at least 75 parts by weight of methyl methacrylate, from 0.5 to 25 parts by weight of glycidyl acrylate or methacrylate and at least 24.5 parts by weight of other copolymerisable ethylenically unsaturated monomeric materials which do not react with the glycidyl acrylate or methacrylate moiety of the copolymer, the total parts being 100.

References Cited

UNITED STATES PATENTS

| | | | |
|---|---|---|---|
| 2,580,901 | 1/1952 | Erickson et al. | 260—86.1 X |
| 2,949,445 | 8/1960 | Blake | 260—86.1 |
| 3,288,736 | 11/1966 | Wright et al. | 260—23 |
| 3,433,753 | 3/1969 | Farkas et al. | 260—22 |

FOREIGN PATENTS

| | | | |
|---|---|---|---|
| 551,429 | 1/1958 | Canada | 260—23 |
| 6,408,834 | 2/1966 | Netherlands. | |

DONALD E. CZAJA, Primary Examiner

D. J. BARRACK, Assistant Examiner

U.S. Cl. X.R.

117—132 BE, 161 UZ, 161 UT; 260—23 AR, 47 UP, 66, 78 A, 80.81, 86.1 R, 86.1 N